United States Patent
Sameshima et al.

(10) Patent No.: US 9,507,370 B2
(45) Date of Patent: Nov. 29, 2016

(54) VOLTAGE CONVERSION CIRCUIT WITH IMPROVED CONVERSION EFFICIENCY

(75) Inventors: Hiroshi Sameshima, Nara (JP); Misato Nabeto, Nara (JP); Tatsuakira Masaki, Nara (JP); Hiroshi Tsuji, Kyoto (JP)

(73) Assignee: OMRON Corporation, Kyoto (JP)

( * ) Notice: Subject to any disclaimer, the term of this patent is extended or adjusted under 35 U.S.C. 154(b) by 208 days.

(21) Appl. No.: 14/356,408

(22) PCT Filed: Aug. 28, 2012

(86) PCT No.: PCT/JP2012/071646
§ 371 (c)(1),
(2), (4) Date: Jul. 1, 2014

(87) PCT Pub. No.: WO2013/080616
PCT Pub. Date: Jun. 6, 2013

(65) Prior Publication Data
US 2014/0328101 A1   Nov. 6, 2014

(30) Foreign Application Priority Data
Nov. 28, 2011   (JP) .................................. 2011-259461

(51) Int. Cl.
*H02M 3/07* (2006.01)
*G05F 5/00* (2006.01)
(Continued)

(52) U.S. Cl.
CPC ................. *G05F 5/00* (2013.01); *H02J 7/022* (2013.01); *H02M 3/07* (2013.01); *H02M 7/06* (2013.01)

(58) Field of Classification Search
CPC ........................ H02M 3/07; H02M 2003/072
USPC ............................................. 307/109; 363/62
See application file for complete search history.

(56) References Cited

U.S. PATENT DOCUMENTS

| 3,743,914 A * | 7/1973 | Holz ........................ H03K 3/57 307/108 |
| 7,468,898 B2 * | 12/2008 | Ogata ...................... H02M 3/07 307/109 |
| 2002/0051372 A1 * | 5/2002 | Hoshino .................. H02M 3/07 363/60 |

(Continued)

FOREIGN PATENT DOCUMENTS

| JP | 2004-23993 A | 1/2004 |
| JP | 2004-80942 A | 3/2004 |

(Continued)

OTHER PUBLICATIONS

International Search Report for corresponding International Application No. PCT/JP2012/071646, mailed Nov. 20, 2012 (4 pages).

*Primary Examiner* — Jeffrey Sterrett
(74) *Attorney, Agent, or Firm* — Osha Liang LLP

(57) ABSTRACT

A voltage conversion circuit has a plurality of primary capacitors charged by a power supply, a secondary capacitor connected in parallel to the respective plurality of primary capacitors that is charged at a voltage supplied to a load circuit, a plurality of switching circuits provided in association with the respective plurality of primary capacitors that change over a connection state between the primary capacitors and the secondary capacitor, and a connection control circuit that successively connects the respective primary capacitors to the secondary capacitor through the corresponding switching circuits, the respective primary capacitors across which the charging voltages reach a predetermined connection voltage higher than a charging voltage across the secondary capacitor.

10 Claims, 10 Drawing Sheets

(51) Int. Cl.
*H02J 7/02* (2016.01)
*H02M 7/06* (2006.01)

(56) References Cited

U.S. PATENT DOCUMENTS

| | | | | |
|---|---|---|---|---|
| 2003/0058666 A1* | 3/2003 | Myono | ............... | H02M 3/07 363/59 |
| 2004/0264223 A1* | 12/2004 | Pihlstrom | ............ | H02M 3/07 363/89 |
| 2005/0088059 A1 | 4/2005 | Ohkubo et al. | | |
| 2007/0222501 A1* | 9/2007 | Georgescu | ........... | H02M 3/07 327/536 |
| 2009/0278520 A1* | 11/2009 | Perreault | ............. | H02M 3/07 323/282 |
| 2010/0188065 A1* | 7/2010 | Shiwaya | ............ | H02M 3/07 323/299 |
| 2011/0062940 A1* | 3/2011 | Shvartsman | ........... | H02M 3/07 323/351 |
| 2011/0128761 A1* | 6/2011 | Ripley | ............... | H02M 3/07 363/62 |
| 2011/0175591 A1* | 7/2011 | Cuk | ............... | H02M 3/07 323/311 |
| 2013/0147543 A1* | 6/2013 | Dai | ............... | H02M 3/07 327/536 |
| 2013/0200860 A1* | 8/2013 | Takeda | ............ | H02J 7/0024 320/167 |
| 2013/0201742 A1* | 8/2013 | Nabeto | ............ | H02M 3/07 363/140 |
| 2014/0070787 A1* | 3/2014 | Arno | ............ | H02M 3/07 323/304 |
| 2014/0328101 A1* | 11/2014 | Sameshima | ........... | H02J 7/022 363/126 |

FOREIGN PATENT DOCUMENTS

| | | |
|---|---|---|
| JP | 2005-130624 A | 5/2005 |
| JP | 2005-198453 A | 7/2005 |
| JP | 2005-287110 A | 10/2005 |
| JP | 2005-341661 A | 12/2005 |
| JP | 2008-281685 A | 11/2008 |
| JP | 2009-124807 A | 6/2009 |

* cited by examiner

Fig. 3(a)

Primary capacitor capacitance: 10 μF
Secondary capacitor capacitance: 10 μF

| Primary capacitor voltage (V) | | Secondary capacitor voltage (V) | | Voltage ratio (%) | Charge-transfer efficiency (%) |
|---|---|---|---|---|---|
| Initiation | Termination | Initiation | Termination | | |
| 10.0 | 5.0 | 0.0 | 5.0 | 0.0 | 33.3 |
| 10.0 | 7.5 | 5.0 | 7.5 | 50.0 | 71.4 |
| 10.0 | 9.0 | 8.0 | 9.0 | 80.0 | 89.5 |
| 10.0 | 9.5 | 9.0 | 9.5 | 90.0 | 94.8 |

Fig. 3(b)

Primary capacitor capacitance: 1 μF
Secondary capacitor capacitance: 10,000,000 μF

| Primary capacitor voltage (V) | | Secondary capacitor voltage (V) | | Voltage ratio (%) | Charge-transfer efficiency (%) |
|---|---|---|---|---|---|
| Initiation | Termination | Initiation | Termination | | |
| 10.0 | 0.000010 | 0.0 | 0.000010 | 0.0 | 0.0 |
| 10.0 | 5.000001 | 5.0 | 5.000001 | 50.0 | 66.7 |
| 10.0 | 8.000001 | 8.0 | 8.000001 | 80.0 | 88.9 |
| 10.0 | 9.000001 | 9.0 | 9.000001 | 90.0 | 94.7 |

Primary voltage ratio
(= Primary-capacitor-group total charging voltage /
Open-circuit voltage in vibration power generation device)

Primary voltage ratio

Primary voltage ratio

VOLTAGE CONVERSION CIRCUIT WITH IMPROVED CONVERSION EFFICIENCY

BACKGROUND

Technical Field

The present invention relates to a voltage conversion circuit for lowering an output voltage from a power supply into a voltage supplied to a load circuit, and an electronic apparatus including the same.

Related Art

Due to recent trends toward energy saving, attention has been focused on environmental energy which exists commonly and does not rely on fossil fuels and the like. Power generation energy from sunlight, wind power and the like has been widely known as such environmental energy. On the other hand, as environmental energy with an energy density not lower than that of such power generation energy, there is vibration energy existing commonly in daily life. In order to supply a load circuit with electric power from a power generation device adapted to perform power generation from such vibration energy, there has been a circuit for performing voltage conversion thereof into a supply voltage suitable for the load circuit. Therefore, conventionally, studies have been made to improve the conversion efficiency.

For example, in consideration of the difficulty in attaining desired voltage drop due to the output impedance of the vibration power generation device, there has been disclosed a technique for suppressing degradation of the voltage conversion efficiency (refer to Patent Document 1). According to the technique, there are provided switching circuits for changing over the connection states of the plurality of capacitors to a power supply circuit and to a load circuit, between serial connection and parallel connection, such that the number of capacitors connected through the switching circuits is controlled, based on the input voltage from the power supply circuit and the frequency thereof. In addition, Patent Document 2 discloses a technique for performing efficient power generation from vibration with smaller vibration amplitude. According to this technique, ON/OFF control is performed on a switch for controlling electric power outputted from a vibration power generation device, based on a period of vibration, in order to change the period of the outputted electric power.

Patent Document 1: Japanese Unexamined Patent Publication No. 2009-124807

Patent Document 2: Japanese Unexamined Patent Publication No. 2005-130624

Patent Document 3: Japanese Unexamined Patent Publication No. 2005-198453

SUMMARY

In a case where the output voltage from an AC power supply is accumulated, once, in a plurality of capacitors connected in series thereto and, thereafter, the energy accumulated in these capacitors is supplied, at the same time, to a load circuit which is connected in parallel to the respective capacitors, the number of plurality of capacitors which are supplied with electric power directly from the AC power supply is fixed. However, in such an AC power supply, which is a device adapted to convert external energy into electric power, such as a vibration power generation device, for example, the output voltage is not always stabilized and may be fluctuated due to various causes. When the number of capacitors supplied with electric power therefrom is fixed, if the output voltage from the AC power supply varies from an expected voltage, this makes it hard to preferably maintain the electric-power supply efficiency.

A voltage conversion circuit according to one or more embodiments of the present invention may be capable of bringing the voltage conversion efficiency in lowering the output voltage from a power supply into a voltage supplied to a load circuit, into a most preferable possible state.

According to one or more embodiments of the present invention, a voltage conversion circuit provided between a power supply and a load circuit is provided with a plurality of primary capacitors to be charged by the power supply, and furthermore, is adapted to connect, to a secondary capacitor, the primary capacitors having been charged to a state where the charging voltages thereacross are higher than the charging voltage across the secondary capacitor, individually, thereby charging the secondary capacitor at a preferable efficiency. Further, on the premise of this capacitor structure having the two stages, there is provided a structure for adjusting the number of primary capacitors connected in series to the power supply such that they can be supplied with electric power from the power supply, in order to improve the efficiency of the entire voltage conversion circuit.

More specifically, according to one or more embodiments of the present invention, there is provided a voltage conversion circuit including: a plurality of primary capacitors which are charged by a power supply; a secondary capacitor which is connected in parallel to the respective plurality of primary capacitors and is configured to be charged at a voltage supplied to a load circuit; a plurality of switching circuits which are provided in association with the respective plurality of primary capacitors and are configured to change over a connection state between the primary capacitors and the secondary capacitor; a connection control circuit configured to successively connect the respective primary capacitors to the secondary capacitor through the corresponding switching circuits, the respective primary capacitors across which the charging voltages have reached a predetermined connection voltage higher than a charging voltage across the secondary capacitor; and an adjustment circuit configured to adjust a connection state between the power supply and the plurality of primary capacitors, such that at least some primary capacitors included in the plurality of primary capacitors are in a state of being connected in series to the power supply, in order to maintain an efficiency of electric-power supply from the power supply to the plurality of primary capacitors at a predetermined efficiency.

In the voltage conversion circuit, the plurality of primary capacitors are charged by the power supply, and the charging voltages across the respective primary capacitors are resulted from sharing and dividing the output voltage from the power supply, according to the capacitances of the respective primary capacitors. The plurality of primary capacitors can all have the same capacitance, and also, some or all of the primary capacitors can have different capacitances. In this case, "the same" capacitance refers to a so-called nominal value thereof, and the capacitance variations due to differences among the individual capacitors are not considered therein.

The respective plurality of primary capacitors are connected to the secondary capacitor through the switching circuits corresponding to the respective primary capacitors. Namely, each primary capacitor is independently connected to or disconnected from the secondary capacitor through the corresponding switching circuit. Note that, in the voltage conversion circuit according to one or more embodiments of the present invention, the secondary capacitor can be structured to include either a single capacitor or two or more capacitors. It is important only that the secondary capacitor can be connected to or disconnected from each of the plurality of primary capacitors through the switching circuit, and it is possible to properly determine the number of capacitors constituting the secondary capacitor itself, and the form of the connection between the capacitors.

The connection control circuit controls the connection and the disconnection between each primary capacitor and the secondary capacitor. The connection control circuit is adapted to connect, to the secondary capacitor, a primary capacitor across which the charging voltage has reached the predetermined connection voltage higher than the charging voltage across the secondary capacitor, rather than connecting all the plurality of primary capacitors to the secondary capacitor at the same time for charging the secondary capacitor. By employing the structure having the connection control circuit adapted to control the connection state between the primary capacitors and the secondary capacitor, according to the relationship between the charging voltage across the secondary capacitor and the charging voltage across each of the plurality of primary capacitors, as described above, it is possible to control the connection between the primary capacitors and the secondary capacitor, based on the charging voltage across each primary capacitor, even when the primary capacitors have capacitances with relatively-larger variations. This can eliminate the influence of variations in the capacitances of the primary capacitors on the charging of the secondary capacitor, as much as possible.

Further, in the voltage conversion circuit according to one or more embodiments of the present invention, the adjustment circuit performs adjustments regarding the connection state of the primary capacitors, for the supply of electric power from the power supply to the plurality of primary capacitors. The efficiency of the supply of electric power varies depending on the relationship between the output voltage from the power supply and the total charging voltage across the primary capacitors connected in series to the power supply. In the present description, the state of the primary capacitors connected in series to the power supply is referred to as a serial connection state. Therefore, the adjustment circuit is adapted to perform adjustments as to which primary capacitors, out of the plurality of primary capacitors, are brought into the state of being connected in series to the power supply, thereby making the aforementioned electric-power supply efficiency equal to the predetermined efficiency.

As described above, in the voltage conversion circuit according to one or more embodiments of the present invention, the connection control circuit is adapted to control the transfer of electric power between the plurality of primary capacitors and the secondary capacitor, and the adjustment circuit is adapted to control the supply of electric power from the power supply to the plurality of primary capacitors, thereby making the voltage conversion efficiency in its entirety most preferable. Note that, both the controls are not performed completely independently of each other, and both the controls involve the plurality of primary capacitors, which may cause the contents of one of the controls to exert some influences on the contents of the other control. Therefore, the adjustment circuit can be also adapted to adjust the connection state between the power supply and the primary capacitors, in consideration of the contents of the control by the connection control circuit, in order to improve the efficiency of the voltage conversion circuit.

For example, through the control by the connection control circuit, charging of the secondary capacitor by the primary capacitors (transfer of electric power therebetween) is performed. Therefore, the primary capacitor being under this control is placed under a different condition regarding the supply of electric power thereto from the power supply, in comparison with the other primary capacitors. Therefore, in the voltage conversion circuit, the adjustment circuit can be also adapted to adjust the connection state between the power supply and the plurality of primary capacitors, based on the state of charging of the secondary capacitor by the plurality of primary capacitors. By this configuration, it is possible to realize control by the adjustment circuit, based on a parameter to be considered in view of the improvement of the efficiency of the voltage conversion circuit, in transferring electric power between the primary capacitors and the secondary capacitor. This can contribute to the improvement of the efficiency of the entire voltage conversion circuit.

As a first example of the control by the adjustment circuit based on the state of charging of the secondary capacitor by the plurality of primary capacitors, the adjustment circuit can be adapted to select primary capacitors to be in a state of being connected in serial to the power supply, out of the plurality of primary capacitors, and to bring the selected primary capacitors into the serial connection state, in such a way as to supply electric power to the plurality of primary capacitors from the power supply at the aforementioned predetermined efficiency, in a state where the secondary capacitor is not charged by the plurality of primary capacitors. By bringing the primary capacitors into the state of being connected in series to the power supply, as described above, it is possible to efficiently supply electric power from the power supply to the primary capacitors in the serial connection state, in the state where the secondary capacitor is not charged by the primary capacitors. Accordingly, this structure is particularly effective, when time intervals during which the secondary capacitor is not charged by the primary capacitors are relatively longer than time intervals during which the charging is performed.

Next, as a second example of the control by the adjustment circuit based on the state of charging of the secondary capacitor by the plurality of primary capacitors, the adjustment circuit can be adapted to select primary capacitors to be in a state of being connected in serial to the power supply, out of the plurality of primary capacitors, and to bring the selected primary capacitors into the serial connection state, in such a way as to supply electric power to the plurality of primary capacitors from the power supply at the aforementioned predetermined efficiency, in a state where the secondary capacitor is charged by the plurality of primary capacitors. By bringing the primary capacitors into the state of being connected in series to the power supply, as described above, it is possible to efficiently supply electric power from the power supply to the primary capacitors in the serial connection state, in the state where the secondary capacitor is charged by the primary capacitors. Accordingly, this structure is particularly effective, when time intervals during which the secondary capacitor is charged by the primary capacitors are relatively longer than time intervals during which the charging is not performed.

Next, as a third example of the control by the adjustment circuit based on the state of charging of the secondary capacitor by the plurality of primary capacitors, the adjustment circuit can be configured to select primary capacitors to be in a state of being connected in serial to the power supply, out of the plurality of primary capacitors, and to bring the selected primary capacitors into the serial connection state, in such a way as to supply electric power to the plurality of primary capacitors from the power supply at the aforementioned predetermined efficiency, based on the changeover of the primary capacitor which is charging the secondary capacitor, the changeover performed by the connection control circuit. By bringing the primary capacitors into the state of being connected in series to the power supply, as described above, it is possible to select primary capacitors to be in the state of being connected in serial to the power supply and to adjust the connection state thereof, in such a way as to enable efficient supply of electric power thereto, every time the primary capacitor charting the secondary capacitor has been changed over. Accordingly, with this structure, it is possible to maintain the supply of electric power to the primary capacitors from the power supply at a preferable state, regardless of which primary capacitor is being connected to the secondary capacitor.

In this case, the control by the adjustment circuit can be also treated in view of the state of the connection between the primary capacitors and the power supply circuit. Namely, in the voltage conversion circuit, based on the state of the connection between the power supply and a predetermined primary capacitor which is included in the plurality of primary capacitors and, also, is set to be in a state of being connected in serial to the power supply, the adjustment circuit can be adapted to adjust the serial connection state between the power supply and a preliminary primary capacitor which is included in the plurality of primary capacitors and, also, is different from the predetermined primary capacitor. By properly using this preliminary primary capacitor, it is possible to avoid reduction of the efficiency of electric-power supply from the power supply to the primary capacitors.

More specifically, the power-supply conversion circuit can be also structured such that the adjustment circuit additionally connects the preliminary primary capacitor to the power supply, in a serial connection state, when the predetermined primary capacitor is not in a state of being connected in serial to the power supply. Thus, when the predetermined primary capacitor, which has been preliminarily set to be in a state of being connected in serial to the power supply based on the electric-power supply efficiency, is not in a state of being supplied with electric power from the power supply, the adjustment circuit incorporates, therein, the preliminary primary capacitor having been preliminarily provided in the plurality of primary capacitors, as a primary capacitor to be supplied with electric power from the power supply, thereby attaining an adjustment in such a way as to prevent reduction of the efficiency of the electric-power supply from the power supply. In one or more embodiments of the present invention, the preliminary primary capacitor can be any primary capacitor capable of being supplied with electric power by being in a state of being connected in series to the power supply, at the time point when the predetermined primary capacitor is not in a serial connection state, as well as a capacitor which preliminarily serves as a primary capacitor only when the predetermined primary capacitor is not in a serial connection state. Namely, in the present description, the expression of "preliminary" is not intended to restrict the primary capacitor to permanently-preliminary operations and is intended to determine it to perform preliminary operations for the sake of assisting the predetermined primary capacitors, and thus, is not intended to impose, thereon, other restrictions than preliminary operations.

In the aforementioned voltage conversion circuit, there may be provided an excessive-voltage preventing circuit including a Zener diode in association with each of the plurality of primary capacitors for preventing the inter-terminal voltages across these primary capacitors from exceeding a predetermined voltage. The voltage conversion circuit may be configured such that, when the excessive-voltage preventing circuit restricts the inter-terminal voltage across the predetermined primary capacitor to the predetermined voltage in a state where the predetermined primary capacitor is supplied with electric power from the power supply, the adjustment circuit performs a changeover to the preliminary primary capacitor from the predetermined primary capacitor across which the inter-terminal voltage is restricted to the predetermined voltage, in such a way as to bring the preliminary primary capacitor into a state of being connected in series to the power supply. If the inter-terminal voltages across the primary capacitors try to exceed the predetermined voltage, the excess voltage is consumed by the excessive-voltage preventing circuits, thereby avoiding excessive voltages across the primary capacitors. Particularly, in the control by the connection control circuit, the switching circuits are controlled in terms of their connections and disconnections, in consideration of the efficiency of charging of the secondary capacitor and, therefore, it is important to avoid excessive voltages across the primary capacitors. On the other hand, in the control by the adjustment circuit, the inter-terminal voltages across the primary capacitors which are in the state of being connected in serial to the power supply exert influence on the efficiency of the supply of electric power from the power supply and, therefore, it is important to avoid excessive voltages across the primary capacitors as well. In the state where the voltage restriction is performed by the excessive-voltage preventing circuits including the Zener diodes as described above, the amount of electric power supplied to the primary capacitors from the power supply is not substantially increased, which means that the supplied electric power is wastefully consumed. Therefore, by connecting the preliminary primary capacitor thereto instead of the predetermined primary capacitor across which the inter-terminal voltage is restricted as described above, it is possible to avoid reduction of the electric-power utilization efficiency. "The preliminary primary capacitor" is as described above. In addition, as another method using the excessive-voltage preventing circuit, it is also possible to employ a structure for separating the primary capacitors from the power supply, through switching circuits.

Furthermore, in the aforementioned voltage conversion circuit, the connection control circuit can be also adapted to control the connection state between the primary capacitors and the secondary capacitor, in such a way as to prevent electric short-circuits between the primary capacitors. This is because, if short-circuits occur between the primary capacitors, this makes it impossible to preferably charge the secondary capacitor. Thus, it is considered that this contributes to improvement of the efficiency of the voltage conversion circuit.

Regarding the aforementioned predetermined connection voltage in the control by the connection control circuit, the predetermined connection voltage can have a voltage value higher than that of the charging voltage across the secondary capacitor, such that the voltage difference between the charging voltage across the primary capacitor and the charging voltage across the secondary capacitor is a voltage difference which causes the charge-transfer efficiency from the primary capacitor to the secondary capacitor to be equal to or higher than a predetermined efficiency. Namely, the predetermined connection voltage is determined, in consideration of the fact that the voltage difference between the charging voltage across the primary capacitor and the charging voltage across the secondary capacitor exerts influences on the charge-transfer efficiency from the primary capacitor to the secondary capacitor. It has been founded that, if the charging voltage across the primary capacitor is higher than the charging voltage across the secondary capacitor, namely if the aforementioned voltage difference is larger, the charge-transfer efficiency tends to decrease. This tendency itself is basically not changed, even when there is a difference in capacitance for the primary capacitor and the secondary capacitor. Therefore, according to one or more embodiments of the present invention, the predetermined connection voltage for use in determining whether the primary capacitors should be connected to the secondary capacitor through the connection control circuit, in consideration of this tendency of the charge-transfer efficiency, is determined. Experimentally, according to one or more embodiments of the present invention, the predetermined connection voltage is a voltage of about 1.1 to 1.2 times the charging voltage across the secondary capacitor, which makes the aforementioned predetermined efficiency equal to or higher than 85%.

In the aforementioned voltage conversion circuit, the power supply can either include a vibration power generation device for converting external vibration energy into electric power or be a power supply device capable of supplying other electric power. Also, one or more embodiments of the present invention can be treated with regard to an electronic apparatus including the aforementioned voltage conversion circuit according to one or more embodiments of the present invention. Namely, according to one or more embodiments of the present invention, there is provided an electronic apparatus including the aforementioned voltage conversion circuit and the load circuit, such that the voltage conversion circuit lowers the output voltage from the power supply to a voltage supplied to the load circuit.

According to one or more embodiments of the present invention, it is possible to bring the voltage conversion efficiency in lowering the output voltage from the AC power supply to the voltage supplied to the load circuit, into a most preferable possible state.

BRIEF DESCRIPTION OF THE DRAWINGS

FIGS. 3(a)-3(b) show tables illustrating the relationship of the charge-transfer rate for a primary capacitor and a secondary capacitor to the charging voltage across the primary capacitor and the charging voltage across the secondary capacitor.

DETAILED DESCRIPTION

Hereinafter, embodiments of the present invention will be described, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Further, the structures according to the embodiments which will be described later are merely illustrative, and the present invention is not intended to be restricted to the structures according to these embodiments.

First Example

Figure 1:
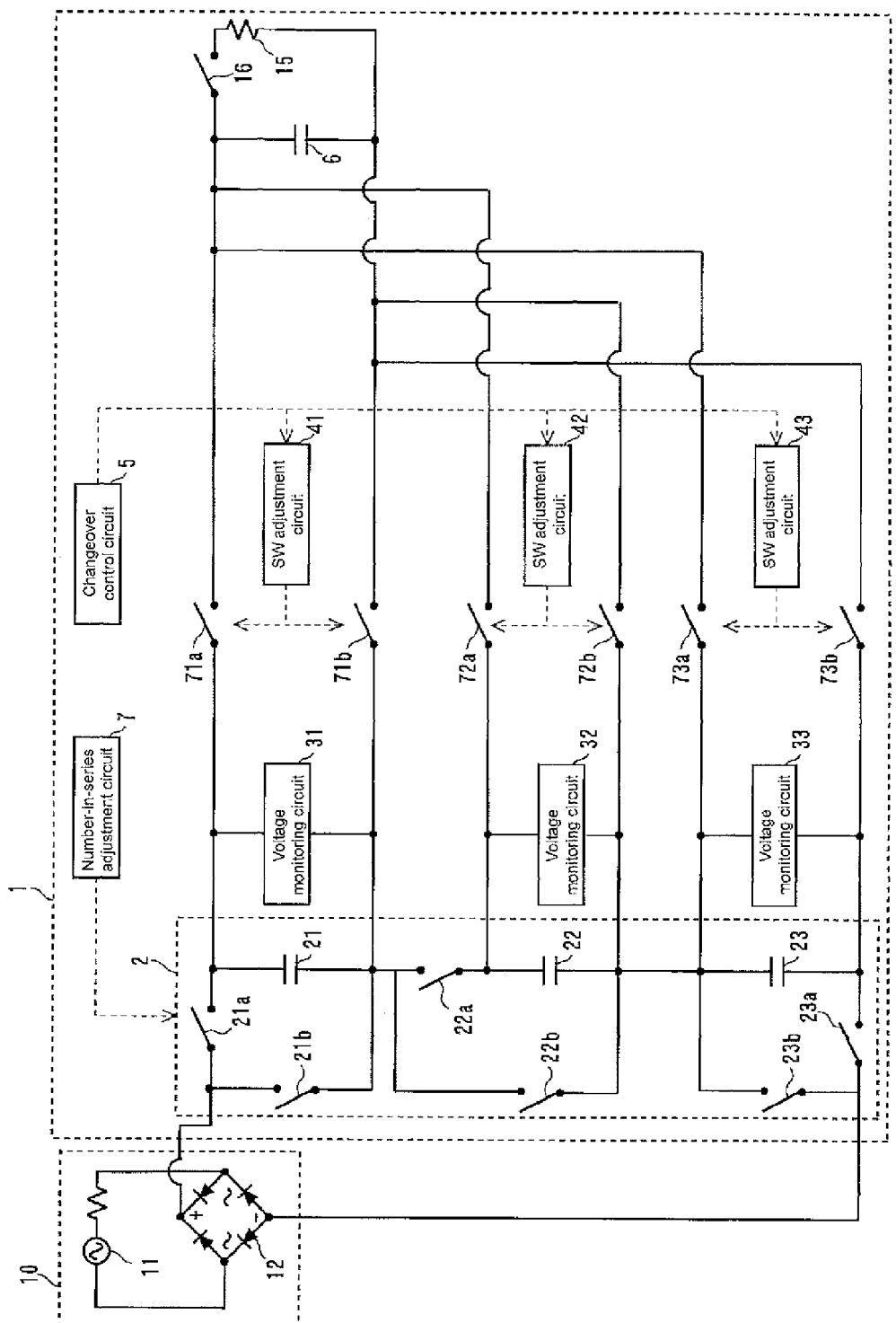
FIG. 1 is a diagram schematically illustrating the stricture of a voltage conversion circuit according to one or more embodiments of the present invention.

FIG. 1 schematically illustrates the structure of voltage conversion circuit 1 which is provided between load circuit 15 and vibration power generation device 11 adapted to perform electric power generation using external vibrations as a source, which corresponds to an AC power supply according to one or more embodiments of the present invention. Voltage conversion circuit 1 is adapted to lower the voltage outputted from vibration power generation device 11 and to include secondary capacitor 6 for accumulating the voltage as a voltage for driving load circuit 15. In one or more embodiments of the present invention, power supply circuit 10 is constituted by vibration power generation device 11, and rectification circuit 12 for rectifying the electric current generated from vibration power generation device 11, and the output from power supply circuit 10 is inputted to voltage conversion circuit 1. As an example of vibration power generation device 11, there is a power generation device formed from an electret material. The vibration power generation device is a well-known technique and, therefore, will not be described in detail in the present description. Power supply circuit 10 can also include other power generation devices than such a vibration power generation device. In one or more embodiments of the present invention, the vibration power generation device employed is formed from an electret material with an amount of power generation of the order of 20 to 100 μW and with an output voltage of the order of 30 to 80 Vp-p, but the application of the present invention is not limited to this device.

Further, between voltage conversion circuit 1 and load circuit 15, there is provided switching circuit 16 for supplying load device 15 with the energy accumulated in secondary capacitor 6 in voltage conversion circuit 1.

In voltage conversion circuit 1, power supply circuit 10 is connected at its output terminal to primary-capacitor group 2 which is constituted by a plurality of primary capacitors connected in series to each other, and the output of power supply circuit 10 is inputted to primary capacitors 21 to 23 included in primary-capacitor group 2. In the structure illustrated in FIG. 1, although primary-capacitor group 2 includes the three primary capacitors, not all the primary capacitors are supplied with electric power from power supply circuit 10. The number of primary capacitors used therein (which will be also referred to as "the number in series", hereinafter) is adjusted through switching circuits 21a, 21b, 22a, 22b, 23a and 23b included in primary-capacitor group 2, in consideration of the supply efficiency in supplying electric power thereto (this adjustment will be described later in detail). In addition, the state of the primary capacitors being connected in series to power supply circuit 10 in order to enable supply of electric power thereto will be also referred to as "a serial connection state".

Switching circuits 21a, 22a and 23a are placed in series to power supply circuit 10, together with the primary capacitors, such that switching circuit 21a is associated with primary capacitor 21, switching circuit 22a is associated with primary capacitor 22, and switching circuit 23a is associated with primary capacitor 23. Therefore, switching circuits 21a, 22a and 23a will be also referred to as "serial switching circuits", hereinafter. Switching circuit 21b turns on and off a bypass line for bypassing primary capacitor 21 and switching circuit 21a associated therewith. Switching circuit 22b turns on and off a bypass line for bypassing primary capacitor 22 and switching circuit 22a associated therewith. Switching circuit 23b turns on and off a bypass line for bypassing primary capacitor 23 and switching circuit 23a associated therewith. Therefore, switching circuits 21b, 22b and 23b will be also referred to as "bypass switching circuits", hereinafter. The adjustment of the number in series of primary capacitors using these switching circuits is performed by number-in-series adjustment circuit 7, and the content thereof will be described later. Note that, in one or more embodiments of the present invention, it is assumed that primary capacitors 21 to 23 have the same capacitance.

Secondary capacitor 6 is wired in such a way as to be connectable in parallel to respective primary capacitors 21 to 23 included in primary-capacitor group 2. In the wiring between each of the primary capacitors and secondary capacitor 6, there are provided switching circuits for changing over between a connection state and a disconnection state between both the capacitors, in association with each primary capacitor. More specifically, switching circuits 71a and 71b are provided between primary capacitor 21 and secondary capacitor 6. Switching circuits 72a and 72b are provided between primary capacitor 22 and secondary capacitor 6. Switching circuits 73a and 73b are provided between primary capacitor 23 and secondary capacitor 6. These switching circuits are controlled in terms of their switching operations, independently of each other, according to the charging voltages across the corresponding primary capacitors and the like, as will be described later. For performing this control, switching adjustment circuits 41 to 43 are installed for the respective corresponding primary capacitors.

Further, for primary capacitors 21 to 23, there are installed voltage monitoring circuits 31 to 33, respectively, for monitoring the charging voltages across these primary capacitors. The charging voltages across the respective primary capacitors which are detected by voltage monitoring circuits 31 to 33 are transmitted to changeover control circuit 5 and number-in-series adjustment circuit 7. Changeover control circuit 5 controls the switching operations of switching circuits 71a to 73b through switching adjustment circuits 41 to 43, based on the charging voltages across the respective primary capacitors which have been transmitted thereto, and based on the charging voltage across secondary capacitor 6. Accordingly, changeover control circuit 5 and switching adjustment circuits 41 to 43 correspond to a connection control circuit according to one or more embodiments of the present invention. Number-in-series adjustment circuit 7 controls the switching operations of serial switching circuits 21a etc. and bypass switching circuits 21b etc., thereby adjusting the state of the serial connection of the primary capacitors to power supply circuit 10. Accordingly, number-in-series adjustment circuit 7, serial switching circuits 21a etc. and bypass switching circuits 21b etc. correspond to an adjustment circuit according to one or more embodiments of the present invention. For secondary capacitor 6, there is provided, along therewith, an upper-limit voltage control circuit which is not illustrated. The upper-limit voltage control circuit is a circuit adapted to restrict the upper-limit voltage (3 to 3.15 V, for example) across secondary capacitor 6, in order to prevent an excessive voltage from being applied to load circuit 15, when the accumulated energy is supplied to load circuit 15. Accordingly, in one or more embodiments of the present invention, secondary capacitor 6 is charged by power supply circuit 10, in such a way as to be maintained at a state of being charged substantially at the upper-limit voltage.

In voltage conversion circuit 1 having the aforementioned structure, the primary capacitors, which are incorporated therein in series to power supply circuit 10 through number-in-series adjustment circuit 7, are supplied with electric power from power supply circuit 10. For example, if serial switching circuits 21a, 22a and 23a are all turned on, the respective primary capacitors are charged by the electric power supplied from power supply circuit 10. Also, if the bypass switching circuits are turned on instead of turning on the serial switching circuits, this prevents the respective primary capacitors corresponding thereto from being charged. Furthermore, the electric power in the primary capacitors having been charged is transferred sequentially to secondary capacitor 6 through operations of switching circuit 71a, thereby charging secondary capacitor 6.

Figure 2:
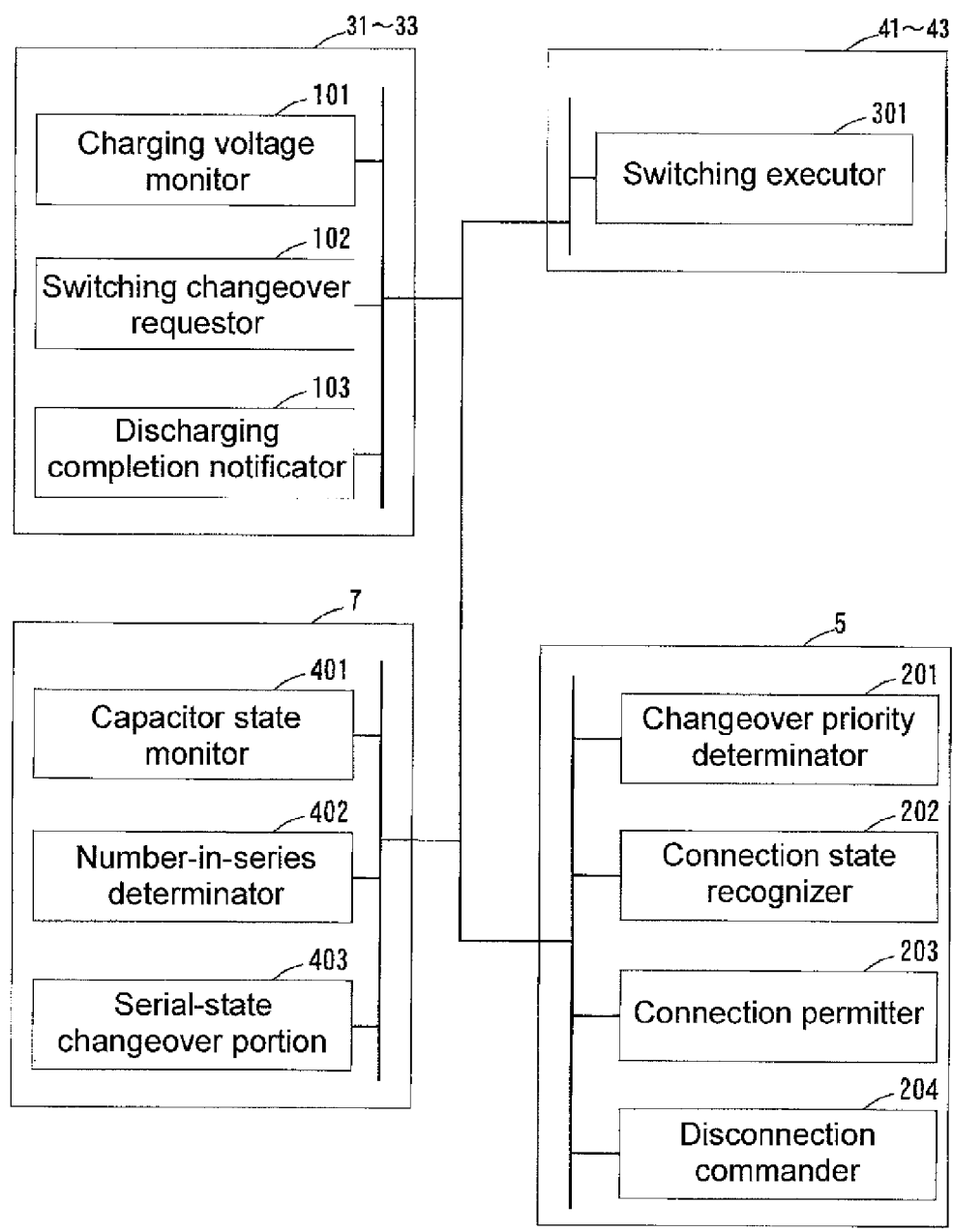
FIG. 2 is a functional block diagram illustrating, by imaging, the functions exerted by the voltage conversion circuit illustrated in FIG. 1.

Hereinafter, there will be described operations for charging secondary capacitor 6 by vibration power generation device 11, with reference to FIG. 2. The charging operations are performed by changeover control circuit 5, number-in-series adjustment circuit 7, voltage monitoring circuits 31 to 33, and switching adjustment circuits 41 to 43, in cooperation with each other, so that the voltage outputted from power supply circuit 10 is lowered to the charging voltage across secondary capacitor 6, the lowered voltage corresponding to the voltage for driving load circuit 15. FIG. 2 is a functional block diagram illustrating, by imaging, the functions exerted by voltage monitoring circuits 31 to 33, switching adjustment circuits 41 to 43, changeover control circuit 5, and number-in-series adjustment circuit 7. The respective circuits may also include functional sections other than those illustrated in FIG. 2.

Voltage monitoring circuits 31 to 33 are provided with charging-voltage monitor 101, switching changeover requestor 102, and discharging completion notification unit 103. Charging-voltage monitor 101 continuously monitors the charging voltages across primary capacitors 21 to 23 corresponding to voltage monitoring circuits 31 to 33, respectively. The values of the charging voltages across the respective primary capacitors, which have been acquired through the monitoring, are transmitted to changeover control circuit 5 at proper timing. In order to transfer the energy accumulated in the primary capacitor to secondary capacitor 6, switching changeover requestor 102 is adapted to make a changeover request to changeover control circuit 5 for causing a primary capacitor to be connected to secondary capacitor 6 by changing over corresponding one of switching circuits 71a to 73b. The condition necessary for making this changeover request is a predetermined condition regarding the charge-transfer efficiency to be satisfied by the relationship between the charging voltages across primary capacitors 21 to 23 and the charging voltage across secondary capacitor 6 (this will be described later, in detail). Next, discharging completion notification unit 103 provides a notification of the completion of discharging, to changeover control circuit 5, when the charging voltage across the primary capacitor has reduced to a predetermined threshold value due to the supply of electric power to secondary capacitor 6 from the aforementioned primary capacitor.

Next, changeover control circuit 5 is provided with changeover priority determination unit 201, connection-state recognizer 202, connection permission unit 203, and disconnection commander 204. Changeover priority determination unit 201 determines the priorities of the connections of the primary capacitors, in such a way as to prevent two or more primary capacitors 21 to 23 from being connected concurrently to secondary capacitor 6 through switching circuits 71a to 73b, namely in such a way as to avoid short-circuits between the primary capacitors. The primary capacitors to be subjected to the determination by changeover priority determination unit 201 are primary capacitors for which the aforementioned switching changeover requestors 102 have made changeover requests. Connection-state recognizer 202 recognizes whether or not any of the primary capacitors is being connected to secondary capacitor 6. Connection permission unit 203 permits the primary capacitors to be connected to secondary capacitor 6, based on the state recognized by connection-state recognizer 202. Disconnection commander 204 generates commands for disconnection, to switching adjustment circuits 41 to 43, in order to cancel the connection states between secondary capacitor 6 and the primary capacitors of interest, based on the notification from aforementioned discharging completion notification unit 103.

Each of the switching adjustment circuits is provided with switching executor 301. Switching executor 301 controls the switching operations of corresponding switching circuits 71a to 73b, according to permission signals from aforementioned connection permission unit 203, or disconnection commands from aforementioned disconnection commander 204.

Number-in-series adjustment circuit 7 is provided with capacitor-state monitor 401, number-in-series determination unit 402, and serial-state changeover section 403. Capacitor-state monitor 401 monitors predetermined states of primary capacitors 21 to 23 and secondary capacitor 6, for changing over the number in series of primary capacitors connected in series to power supply circuit 10. For example, the state of transfer of electric power between each primary capacitor and secondary capacitor 6 relates to the number in series as will be described later and, therefore, is monitored by capacitor-state monitor 401. Number-in-series determination unit 402 determines the number in series of primary capacitors which are connected in series to power supply circuit 10, based on the result of monitoring by capacitor-state monitor 401. Serial-state changeover section 403 actually changes over the state of the connection between the primary capacitors and power supply circuit 10, according to the number in series determined by number-in-series determination unit 402.

Through voltage monitoring circuits 31 to 33, changeover control circuit 5, switching adjustment circuits 41 to 43, and number-in-series adjustment circuit 7, which are formed as described above, voltage conversion circuit 1 is adapted to perform the charging of secondary capacitor 6 by the respective primary capacitors, and the supply of electric power to the respective primary capacitors from power supply circuit 1, in general. Therefore, at first, the former will be described in detail.

<The Process for Charging Secondary Capacitor 6 by the Respective Primary Capacitors>

Further, the order of process items (1) to (5) which will be described later is not restrictive, and the order of the process items can be properly adjusted without being departed from the spirit of the present invention.

(1) The electric current outputted from power supply circuit 10 is accumulated in each of the primary capacitors being connected in serial to power supply circuit 10, thereby increasing the charging voltage across each of the primary capacitors. The changes of the charging voltages across the respective primary capacitors are monitored by charging-voltage monitors 101 in the corresponding voltage monitoring circuits.

(2) If the charging voltage across each primary capacitor, which is monitored by charging-voltage monitor 101, reaches a predetermined connection voltage as a reference, switching changeover requestor 102 transmits a changeover request to changeover control circuit 5.

The predetermined connection voltage is determined, such that, when each primary capacitor has been connected to secondary capacitor 6, the charge-transfer efficiency from the primary capacitor to secondary capacitor 6 has a preferable value. The determination of the predetermined connection voltage will be described with reference to FIGS. 3(a)-3(b). FIGS. 3(a)-3(b) represent the charge-transfer efficiency from a primary capacitor to the secondary capacitor, in association with different charging voltages across the respective capacitors, when the primary capacitor has been connected to the secondary capacitor. Note that the charge-transfer efficiency is theoretically calculated according to the following formula.

> The Charge-Transfer Efficiency=(The Amount of Increase of Energy in the Secondary Capacitor due to Connection)/(The Amount of Decrease of Energy in the Primary Capacitor)

FIGS. 3(a)-3(b) represent, in an upper stage 3(a), a case where the primary capacitor and the secondary capacitor both have a capacitance of 10 µF. FIGS. 3(a)-3(b) also represent, in a lower stage 3(b), a case where the primary capacitor has a capacitance of 1 µF, and the secondary capacitor has a capacitance of 10000000 µF. "Initiation" of the charging voltage across each capacitor refers to the charging voltage at the timing of the start of the connection. "Termination" refers to the charging voltage at the timing when they have been disconnected from each other after the connection. As can be clearly seen from FIGS. 3(a)-3(b), regardless of the capacitances of the primary capacitance and the secondary capacitance, the charge-transfer efficiency tends to increase with decreasing voltage difference between the charging voltage across the primary capacitor and the charging voltage across the secondary capacitor at the initiation.

Therefore, in one or more embodiments of the present invention, in order to cause the charge-transfer efficiency to reach about 85% or higher, electric charges are transferred from the primary capacitor to the secondary capacitor, namely switching changeover requestor 102 is caused to transmit a changeover request to changeover control circuit 5, when the voltage difference between the primary capacitor and the secondary capacitor is such a voltage difference that the charging voltage across the primary capacitor at the initiation is about 1.1 to 1.2 times the charging voltage across the secondary capacitor at the initiation. More specifically, as described above, the upper-limit voltage control circuit is provided along with secondary capacitor 6 and, therefore, the charging voltage thereacross is maintained at about 3 to 3.15 V. Therefore, the predetermined connection voltage is set to be about 3.3 V, in one or more embodiments of the present invention.

(3) Changeover priority determination unit 201 determines the connection precedence of the primary capacitors to be connected to secondary capacitor 6, according to changeover requests from switching changeover requestors 102 in the respective voltage monitoring circuits. In principle, changeover priority determination unit 201 provides connection precedence to the primary capacitors in order of arrivals of the changeover requests therefor. However, higher connection precedence is provided to primary capacitor 21, primary capacitor 22 and primary capacitor 23 in the mentioned order, when there is a possibility of concurrent connections of two or more primary capacitors thereto within an interval during which the connection state should be maintained. Note that, although the connection precedence can be provided thereto in other aspects than the aforementioned aspect, it is important that connection precedence should be provided thereto in such a way as to prevent two or more primary capacitors from being concurrently connected to secondary capacitor 6.

(4) Connection-state recognizer 202 determines whether or not any of the primary capacitors is being connected to secondary capacitor 6. Then, if it is determined that no primary capacitor is being connected thereto, connection permission unit 203 generates a command for permitting the primary capacitor having been provided with the highest connection precedence to be connected to secondary capacitor 6, to the switching circuit corresponding to this primary capacitor. Thus, switching executor 301 in the switching circuit connects both the capacitors to each other, thereby charging secondary capacitor 6. On the other hand, if it is determined that any of them is being connected thereto, connection permission unit 203 is maintained at a state of being standby for generating a command for permitting the connection thereof, until the arrival of a notification of the completion of discharging, from discharging completion notification unit 103 in the voltage monitoring circuit which corresponds to the primary capacitor being currently connected to secondary capacitor 6.

Further, discharging completion notification unit 103 generates the notification of the completion of discharging, when the charging voltage across the primary capacitor reaches a value close to the charging voltage across secondary capacitor 6. If discharging completion notification unit 103 generates the notification of the completion of discharging, disconnection commander 204 generates a disconnection command for disconnecting secondary capacitor 6 from the primary capacitor being connected thereto, to the switching circuit corresponding to this primary capacitor being connected thereto. In the switching circuit having received the command, switching executor 301 disconnects the primary capacitor from the secondary capacitor. At the same time as this disconnection, the switching circuit corresponding to the primary capacitor to be connected to secondary capacitor 6 next to the aforementioned primary capacitor is caused to connect both the capacitors.

Figure 4A:
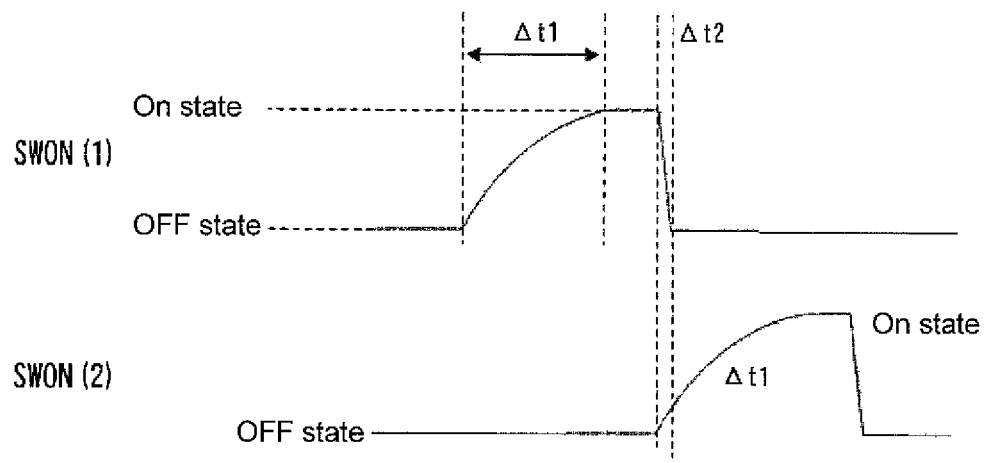
FIGS. 4(a)-4(b) show diagrams relating to the time constants at the times of a connection and a disconnection between the primary capacitor and the secondary capacitor, in charging the secondary capacitor from a power supply circuit.
Figure 4B:
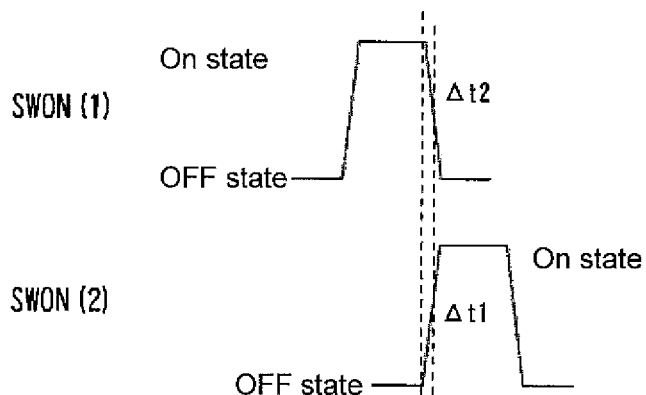

Here, FIGS. 4(a)-4(b) illustrate, in an upper stage 4(a), the transition of the state of the connection between the primary capacitor and the secondary capacitor, at the times of the connection and the disconnection therebetween through the switching circuits. In one or more embodiments of the present invention, connection time constant $\Delta t1$ of when switching executor 301 brings the switching circuits into the connection state (the on state) is set to be relatively longer than disconnection time constant $\Delta t2$ of when it brings the switching circuits into the disconnection state (the off state). For example, $\Delta t1$ is about 7 msec, while $\Delta t2$ has a value which is as close to 0 msec as possible. By setting the connection time constant to be relatively longer, as described above, it is possible to cause electric charges to move slowly. Therefore, even if a connection process is performed with one switching circuit during a disconnection process with another switching circuit, it is possible to prevent a short-circuit between the primary capacitors corresponding to the respective switching circuits. As a result thereof, even if a disconnection process through one switching circuit and a connection process through another switching circuit are performed at the same time as described above, it is possible to substantially avoid a short-circuit between the primary capacitors.

On the other hand, as illustrated in a lower stage in FIG. 4(b), if the connection time constant $\Delta t1$ and disconnection time constant $\Delta t2$ are both made to have a value which is as close to 0 msec as possible, there is a higher possibility of a short-circuit between primary capacitors, in the event that a disconnection process through one switching circuit and a connection process through another switching circuit are performed at the same time, or in the event that both the processes are performed with an extremely-short time interval interposed therebetween. Particularly, in consideration of the importance of connecting substantially only a single primary capacitor to secondary capacitor 6, in voltage conversion circuit 1 according to one or more embodiments of the present invention, it is important to set connection time constant $\Delta t1$ and disconnection time constant $\Delta t2$ in such a way as to avoid short-circuits between primary capacitors.

(5) By properly repeating the aforementioned (1) to (4), the primary capacitors across which the charging voltage has reached the predetermined connection voltage are sequentially connected to the secondary capacitor, in such a way as to prevent short-circuits between the primary capacitors.

This results in charging of the secondary capacitor, in a state where the charge-transfer efficiency between the primary capacitors and the secondary capacitor is maintained at 85% or higher.

Figure 5:
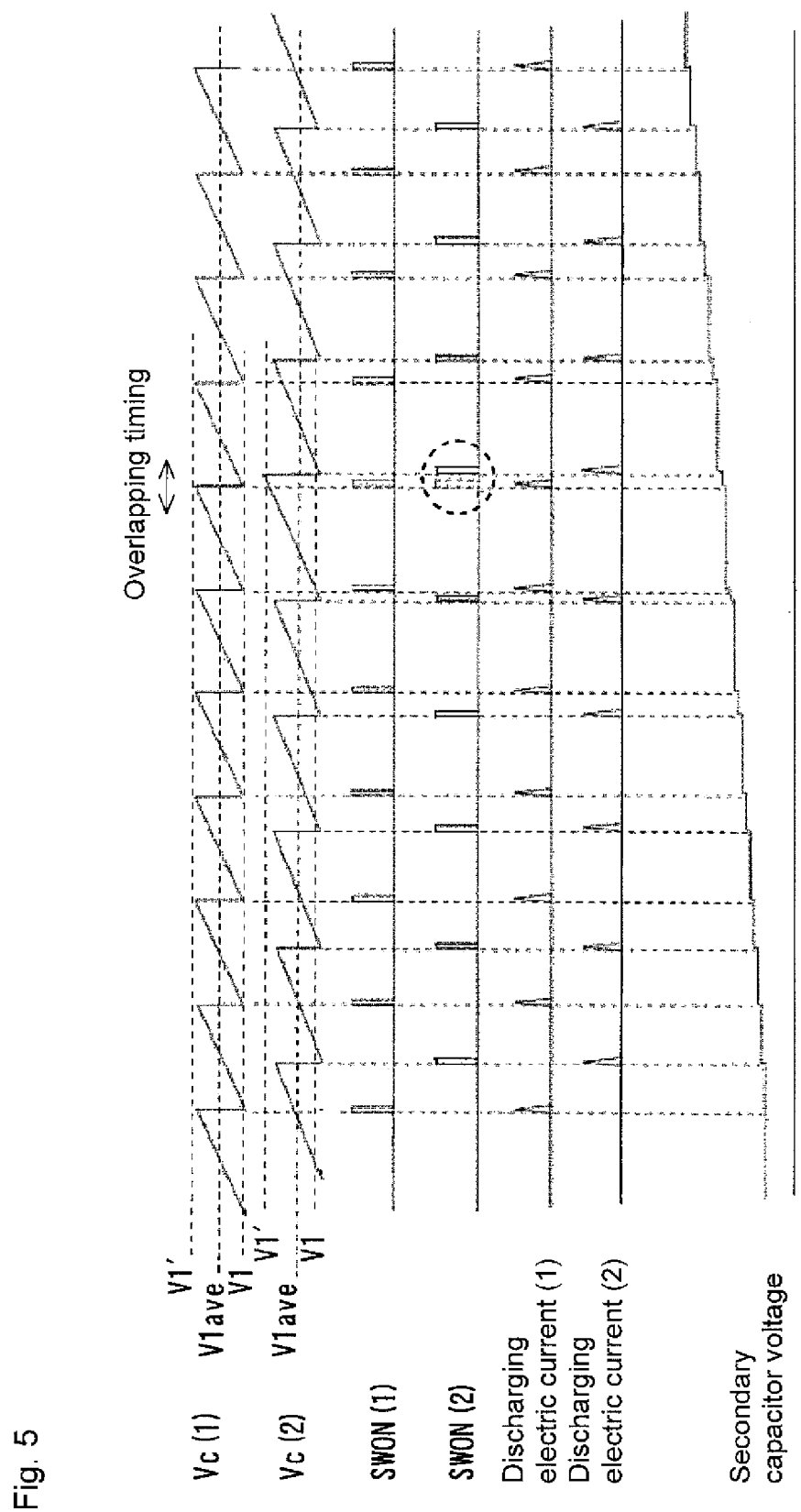
FIG. 5 is a timing chart illustrating the charging voltages across the primary capacitors, ON signals for switching circuits, and the transitions of the discharging electric currents from the primary capacitors to the secondary capacitor, in the voltage conversion circuit according to one or more embodiments of the present invention.

In view of the aforementioned facts, FIG. 5 illustrates a timing chart of operations of voltage conversion circuit 1. This timing chart is on the assumption that the number of primary capacitors is two, for convenience of description. In the upper two stages of the chart, there are illustrated the transitions of the charging voltages across the two primary capacitors. In the next two stages, there are illustrated the changes of the connection states of the switching circuits corresponding to the respective primary capacitors. In the next two stages, there are illustrated the transitions of the discharging electric currents from the respective primary capacitors to the secondary capacitor. In the lowermost stage, there is illustrated the transition of the charging voltage across the secondary capacitor. At the overlapping timing illustrated in the chart, the voltage monitoring circuits corresponding to the two primary capacitors generate changeover requests at the same timing (see the portion encircled by a dotted line, in the chart). Therefore, the connection start timing of one of the primary capacitors (in the lower stage) is deviated purposefully from the time point of the changeover request generated. By this configuration, short-circuits can be avoided between the primary capacitors.

(Process for Supplying Electric Power to the Primary Capacitors from Power Supply Circuit 10)

Next, there will be described the supply of electric power from power supply circuit 10 to the primary capacitors. In voltage conversion circuit 10 according to one or more embodiments of the present invention, in order to enable efficient supply of electric power from vibration power generation device 11, number-in-series adjustment circuit 7 adjusts the number of primary capacitors connected in series to power supply circuit 10. This is because the efficiency of charging the primary capacitors by vibration power generation device 1 varies depending on the ratio between the open-circuit voltage in vibration power generation device 11 and the total charging voltage across the primary capacitors (the primary voltage ratio) and, furthermore, the primary capacitors which can be connected in series to power supply circuit 10 are determined in consideration of the aforementioned electric-power transfer between them and secondary capacitor 6. Therefore, number-in-series adjustment circuit 7 adjusts the number (the number in series) of primary capacitors which are connected in series to power supply circuit 10, based on predetermined conditions of primary capacitors 21 to 23 and secondary capacitor 6.

In this case, the efficiency Ec1 of charging the primary capacitors being connected in series to power supply circuit 10, by vibration power generation device 11, is expressed by the following formula.

Ec1=(the Amount of Energy Accumulated in the Primary Capacitors within Unit Time Interval)/(the Amount of Supplied Electric Power (Generated Electric Power) from Vibration Power Generation Device 11 with Matching Resistance)

Figure 6A:
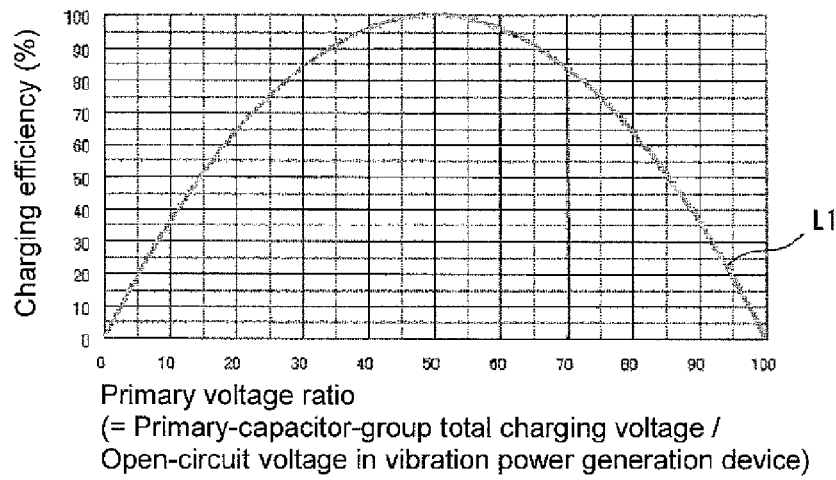
FIG. 6A is a first diagram illustrating the relationship between the ratio of the total charging voltage across the primary-capacitor group to the output voltage from the power supply circuit, and the charging efficiency.

By plotting the theoretical relationship between the primary voltage ratio and the charging efficiency Ec1 defined as described above, it is possible to draw a parabola having an extreme value when the primary voltage ratio is 50%, as represented by line L1 in FIG. 6A. Accordingly, according to one or more embodiments of the present invention, the number in series of primary capacitors is determined, such that the total charging voltage across the primary capacitors connected in series to power supply circuit 10 is half the open-circuit voltage in vibration power generation device 11. More specifically, in consideration of the fact that the voltage change in charging secondary capacitor 6 by the primary capacitor is set to be smaller in view of the charge-transfer efficiency as described above, the number in series is determined according to the following formula, by assuming that the charging voltage across the primary capacitor during this charging is equal to the voltage outputted to load circuit 16 from the secondary capacitor.

The Number in series=(the Open-Circuit Voltage in Vibration Power Generation Device 11)/2/(the Output Voltage from the Secondary Capacitor) (Formula 1)

For example, when the open-circuit voltage is 60 V, and the output voltage from secondary capacitor 6 is 1.5 V, the number in series of primary capacitors is 20. Note that, in the present description, "the open-circuit voltage" is synonymous with the electromotive force from vibration power generation device 11.

Strictly, the charging voltage across the primary capacitor varies due to discharging through the switching operations of switching circuits 71a etc. Therefore, assuming that V1 is the charging voltage across a single primary capacitor (for example, primary capacitor 21) at the initiation of charging secondary capacitor 6 by the primary capacitor through the switching operation (at the timing of the start of the charging), and V1' is the charging voltage thereacross at the time of the termination of the same charging (at the timing of the completion of the charging), it is also possible to determine the number in series, as follows, using the average value of both the voltages: V1ave(=(V1+V1')/2).

The Number in series=(the Open-Circuit Voltage in Vibration Power Generation Device 11)/2/V1ave (Formula 1')

In general, commercially-available capacitors have fixed capacitances. Therefore, it may be difficult to determine the number in series of primary capacitors, such that the total charging voltage across the primary capacitors connected in series to power supply circuit 10 is just half (50%) the open-circuit voltage in vibration power generation device 11, in some cases. In such cases, according to one or more embodiments of the present invention, the number of primary capacitors included therein is determined, such that the total charging voltage across the primary capacitors connected in series to power supply circuit 10 is as close to half the open-circuit voltage in vibration power generation device 11 as possible.

Figure 6B:
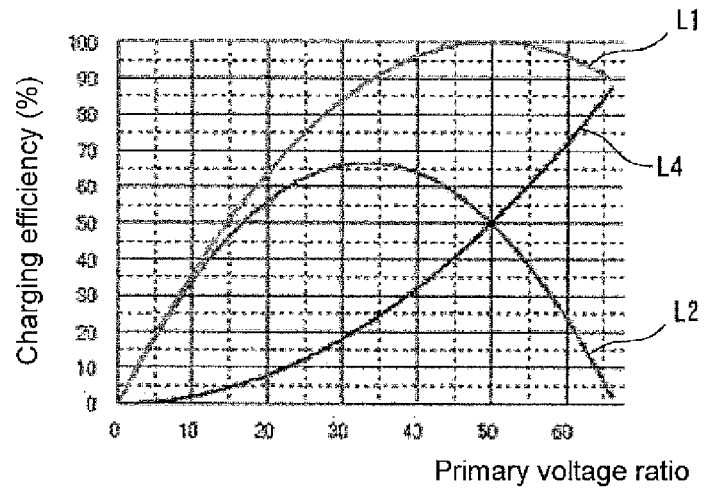
FIG. 6B is a second diagram illustrating the relationship between the ratio of the total charging voltage across the primary-capacitor group to the output voltage from the power supply circuit, and the charging efficiency.
Figure 6C:
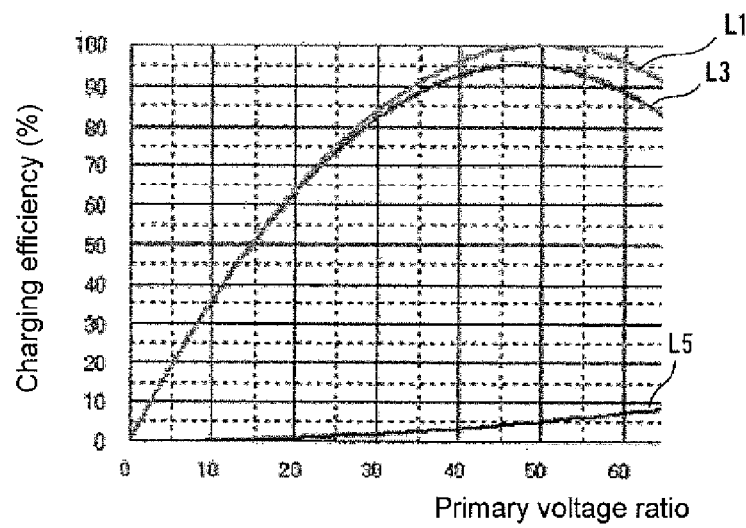
FIG. 6C is a third diagram illustrating the relationship between the ratio of the total charging voltage across the primary-capacitor group to the output voltage from the power supply circuit, and the charging efficiency.

Further, when a load resistance is connected to primary-capacitor group 2, the primary voltage ratio which causes the charging efficiency to have an extreme value is lower than 50%, as represented by line L2 in FIG. 6B or line L3 in FIG. 2C. FIG. 6B is a diagram illustrating the transition of the charging efficiency, in a state where a load resistance of about 10 MΩ is connected to the primary capacitors, in a case where vibration power generation device 11 used therein has an internal resistance of 10 MΩ to 20 MΩ. FIG. 6C is a diagram illustrating the transition of the charging efficiency, in a state where a load resistance of about 100 MΩ is connected to the primary capacitors, in the case of using the same vibration power generation device 11. Furthermore, for reference, line L4 in FIG. 6B and line L5 in FIG. 2C represent the efficiency of electric-power consumption by the load resistance. Causes of the change of the extreme value of the charging efficiency include the fact that the primary capacitors supply energy to the load resistance connected thereto, while accumulating energy in themselves. In voltage conversion circuit 1 illustrated in FIG. 1, voltage monitoring circuits 31 to 33 are connected to the respective primary capacitors included in primary-capacitor group 2, and these circuits correspond to the load resistance. Accordingly, it is also possible to determine the number in series of primary capacitors, in consideration of the internal resistances in voltage monitoring circuits 31 to 33, in voltage conversion circuit 1.

Further, the electric power supplied from power supply circuit 10 is not always constant. For example, vibration power generation device 11 may be fluctuated in power generation performance, due to variations at manufacturing. Furthermore, in view of aging changes of vibration power generation device 11, due to aging changes of its power generation performance due to the so-called life, and changes of the vibration source (deviations of the intensity of the vibration source, the vibration frequency of the vibration source and the resonance frequency of vibration power generation device 11, fluctuations in the power generation performance of vibration power generation device 11 due to changes of the environment therearound, and the like), the voltage applied to primary-capacitor group 2 from power supply circuit 11 can be fluctuated. For coping with such changes of the supplied voltage as well, according to one or more embodiments of the present invention, the number in series of primary capacitors is determined, such that the total charging voltage is theoretically half (50%) the open-circuit voltage in vibration power generation device 11 as described above, in order to enable efficient supply of electric power thereto.

Hereinafter, with reference to FIGS. 7 to 10, there will be described the adjustment of the number in series of primary capacitors, in detail. Further, the number-in-series adjustment processes illustrated in FIGS. 7 to 10 are executed at proper timing by number-in-series adjustment circuit 7.

<Number-in-Series Adjustment Process 1>

At first, a first number-in-series adjustment process illustrated in FIG. 7 will be described. This process is based on the charging state of charging secondary capacitor 6 by the primary capacitor. In this number-in-series determination process, at first, in S101, capacitor-state monitor 401 determines whether or not secondary capacitor 6 is being charged, namely whether or not any capacitor out of primary capacitors 21 to 23 is being connected to secondary capacitor 6 through a corresponding switching circuit. If the result of the determination in S101 is positive, the present control ends. If the result of the determination in S101 is negative, the present control proceeds to S102. Next, in S102, number-in-series determination unit 402 determines the number in series of primary capacitors according to the aforementioned Formula 1 or Formula 1', in the state where secondary capacitor 6 is not being charged, in view of the negative result of the determination in S101. After the completion of the process in S102, the present control proceeds to S103.

In S103, in order to realize the number in series determined in S102, in the state where secondary capacitor 6 is not being charged, the primary capacitors to be in a state of being serial to power supply circuit 10 are determined, and the ON/OFF states of serial switching circuits 21*a* to 23*a* and bypass switching circuits 21*b* to 23*b* are adjusted in order to form this serial state. For example, if the number in series determined in S102 is "2", the primary capacitors to be connected in series to power supply circuit 10 in the state where secondary capacitor 6 is not being charged are determined to be primary capacitors 21 and 22, while the primary capacitor to be unconnected thereto is determined to be primary capacitor 23. Accordingly, in this case, when one of primary capacitor 21 and primary capacitor 22 is in a fully-charged state and is charging secondary capacitor 6, the primary capacitor connected to power supply circuit 10 is only the single primary capacitor which is not charging secondary capacitor 6. The aforementioned process in S103 is performed by serial-state changeover section 403.

Figure 7:
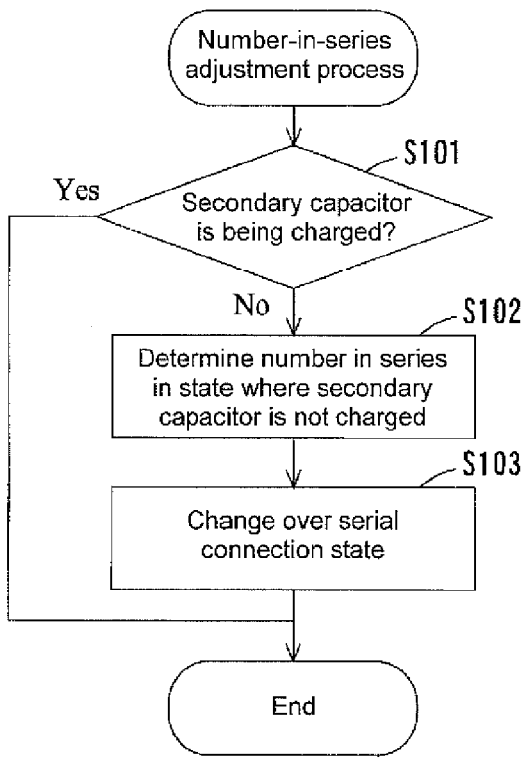
FIG. 7 is a first flow chart of a number-in-series adjustment process which is performed by the voltage conversion circuit illustrated in FIG. 1.

In summary of the aforementioned descriptions, according the number-in-series adjustment process illustrated in FIG. 7, it is possible to realize a state which enables efficient supply of electric power to primary capacitors from power supply circuit 10, within time intervals during which the supply of electric power from these primary capacitors to the secondary capacitor is not performed, namely within time intervals during which all of switching circuits 71*a* etc. are in an OFF state. Accordingly, with the number-in-series adjustment process illustrated in FIG. 7, it is possible to effectively adjust the number in series of primary capacitors, when the time intervals during which secondary capacitor 6 is not charged thereby are relatively longer than the time intervals during which it is charged thereby, in voltage conversion circuit 1.

<Number-in-Series Adjustment Process 2>

Next, a second number-in-series adjustment process illustrated in FIG. 8 will be described. This process is based on the state of charging secondary capacitor 6 by the primary capacitor, similarly to the first number-in-series adjustment process. In this number-in-series determination process, at first, in S201, capacitor-state monitor 401 determines whether or not secondary capacitor 6 is being charged, similarly to the process in S101. If the result of the determination in S201 is positive, the present control proceeds to S202. If the result of the determination in S201 is negative, the present control ends. Next, in S202, the number-in-series determination unit 402 determines the number in series of primary capacitors according to the aforementioned Formula 1 or Formula 1', in the state where secondary capacitor 6 is being charged, in view of the positive result of the determination in S201. After the completion of the process in S202, the present control proceeds to S203.

In S203, in order to realize the number in series determined in S202, in the state where secondary capacitor 6 is being charged, the primary capacitors to be in a state of being serial to power supply circuit 10 are determined, and the ON/OFF states of serial switching circuits 21*a* to 23*a* and bypass switching circuits 21*b* to 23*b* are adjusted, in order to form this serial state. For example, if the number in series determined in S102 is "2", the number of primary capacitors to be connected in series to power supply circuit 10 in the state where secondary capacitor 6 is not being charged is "3". Accordingly, in this non-charging state, primary capacitors 21 to 23 are connected thereto. If any of primary capacitors 21 to 23 is charging secondary capacitor 6, the remaining two primary capacitors are supplied with electric power from power supply circuit 10, thereby attaining improvement of the supply efficiency. The aforementioned process in S203 is performed by serial-state changeover section 403.

Figure 8:
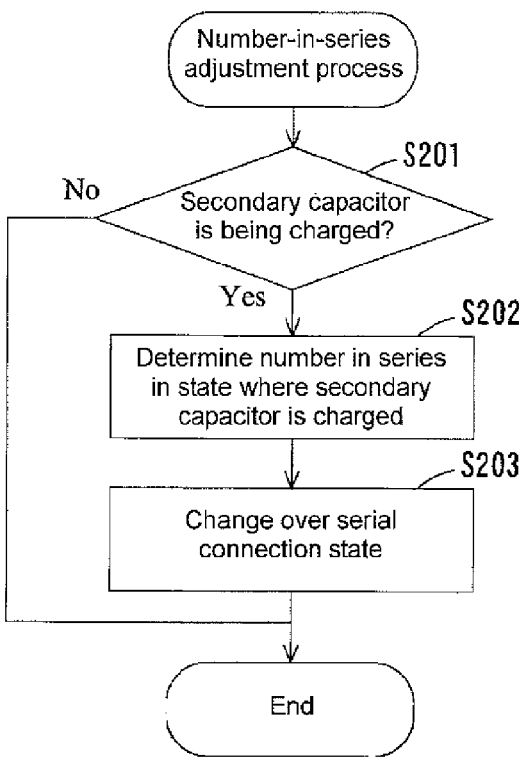
FIG. 8 is a second flow chart of a number-in-series adjustment process which is performed by the voltage conversion circuit illustrated in FIG. 1.

In summary of the aforementioned descriptions, with the number-in-series adjustment process illustrated in FIG. 8, it is possible to realize a state which enables efficient supply of electric power to primary capacitors from power supply circuit 10, within time intervals during which the supply of electric power from a primary capacitor to the secondary capacitor is performed, namely within time intervals during which any of the pairs of switching circuits 71*a* etc. are in an ON state. Within time intervals during which the supply of electric power is not performed, the efficiency of the supply of electric power from power supply circuit 10 is slightly degraded. Accordingly, with the number-in-series adjustment process illustrated in FIG. 8, it is possible to effectively adjust the number in series of primary capacitors, when the time intervals during which secondary capacitor 6 is charged thereby is relatively longer than the time intervals during which it is not charged thereby, in voltage conversion circuit 1.

<Number-in-Series Adjustment Process 3>

Figure 9:
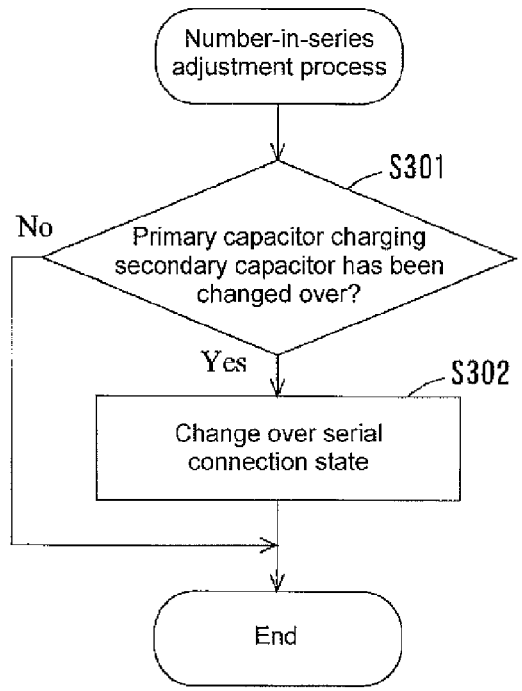
FIG. 9 is a third flow chart of a number-in-series adjustment process which is performed by the voltage conversion circuit illustrated in FIG. 1.

Next, a third number-in-series adjustment process illustrated in FIG. 9 will be described. This process is on the premise that the number in series of primary capacitors has been preliminarily determined to be a predetermined number. At first, in S301, capacitor-state monitor 401 determines whether or not the primary capacitor which is charging secondary capacitor 6 has been changed over. Namely, it is determined whether or not the state of the connection between the primary capacitor and secondary capacitor 6 through changeover control circuit 5 has been changed. If the result of the determination in S301 is positive, the present control proceeds to S302. If the result of the determination is negative, the present control ends. In S302, serial-state changeover section 403 properly changes over the state of the primary capacitors being serial to power supply circuit 10, in such a way as to maintain the number in series which has been preliminarily determined. As described above, with the present process, the serial-connection state of primary capacitors 6 is adjusted in focusing attention to the state of charging secondary capacitor 6 and based on the changeover of the state of charging thereof.

For example, in the case where the number in series of primary capacitors has been determined to be "2" according to the aforementioned Formula 1, the ON/OFF states of serial switching circuits 21a to 23a and bypass switching circuits 21b to 23b are adjusted, in such a way as to bring primary capacitors 21 and 22 into a serial state. At this time, if secondary capacitor 6 is charged by one primary capacitor 21, primary capacitor 21 is separated from power supply circuit 10, which reduces the number in series to below the preliminarily-set value, thereby making it impossible to efficiently supply electric power from power supply circuit 10. Therefore, when primary capacitor 21 is separated therefrom for charging secondary capacitor 6, in order to connect in series to power supply circuit 10 primary capacitor 23 which has not been connected in series to power supply circuit 10 until then, serial switching circuit 23a is brought into an ON state, while bypass switching circuit 23b is brought into an OFF state. As described above, with the present process, it is possible to maintain the number in series of primary capacitors at a predetermined number, thereby enabling efficient supply of electric power thereto, regardless of the state of charging secondary capacitor 6.

The number in series of primary capacitors can be recalculated, at proper timing. Particularly, the number in series can be calculated at timing when the electric power supplied from power supply circuit 10 is likely to be changed, which enables supplying electric power to the primary capacitors more efficiently according to characteristics of power supply circuit 10. The aforementioned processes in S402 and S403 are performed by serial-state changeover section 403.

<Number-in-Series Adjustment Process 4>

Figure 10:
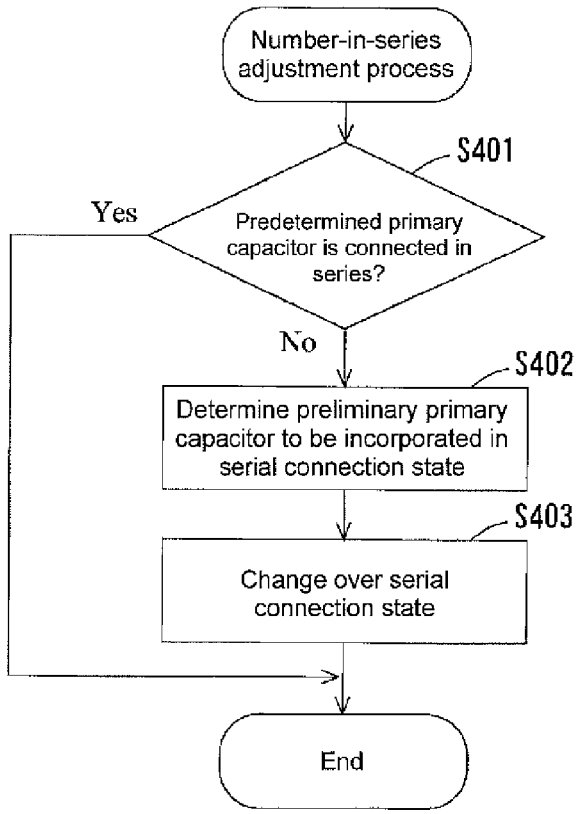
FIG. 10 is a fourth flow chart of a number-in-series adjustment process which is performed by the voltage conversion circuit illustrated in FIG. 1.

Next, a fourth number-in-series adjustment process illustrated in FIG. 10 will be described. This process is on the premise that the number in series of primary capacitors has been preliminarily determined to be a predetermined number. At first, in S401, it is determined whether or not predetermined primary capacitors corresponding to the predetermined number, which has been preliminarily determined, are being connected in series to power supply circuit 10. A positive determination in S401 indicates that the primary capacitors are being efficiently supplied with electric power from power supply circuit 10 and thus, the present control ends. On the other hand, a negative determination in S401 indicates that at least one of the predetermined primary capacitors is charging the secondary capacitor or has reached a fully-charged state and is in a state of being standby for charging the secondary capacitor (which will be also referred to as "a standby state", hereinafter). Accordingly, in this case, the primary capacitors are not being efficiently supplied with electric power from power supply circuit 10 and, therefore, the process in S402 is performed.

In S402, a preliminary primary capacitor to be incorporated in a state of being connected in series to power supply circuit 10 is determined. In S403, in order to incorporate this preliminary primary capacitor therein, the ON/OFF states of a serial switching circuit and a bypass switching circuit which correspond to this primary capacitor are controlled. As described above, with the present process, attention is focused on the state of the serial connection of the primary capacitors to power supply circuit 10, and based on the changeover of the serial connection state thereof, the preliminary primary capacitor is incorporated in power supply circuit 10. This preliminary primary capacitor is an additional primary capacitor incorporated in primary-capacitor group 2 in voltage conversion circuit 1, for the sake of collecting the electric power supplied anytime from power supply circuit 10 without wasting it, when the predetermined primary capacitors have been separated from power supply circuit 10. Also, as another method using a preliminary primary capacitor, if there exists a primary capacitor which can be brought into a state of being connected in series to the power supply to be supplied with electric power therefrom, at the time point when the predetermined primary capacitors are determined not to be in a serial connection state, this primary capacitor can be used as a preliminary primary capacitor in one or more embodiments of the present invention, even though this primary capacitor is not a permanent preliminary primary capacitor.

<Number-in-Series Adjustment Process 5>

Figure 11:
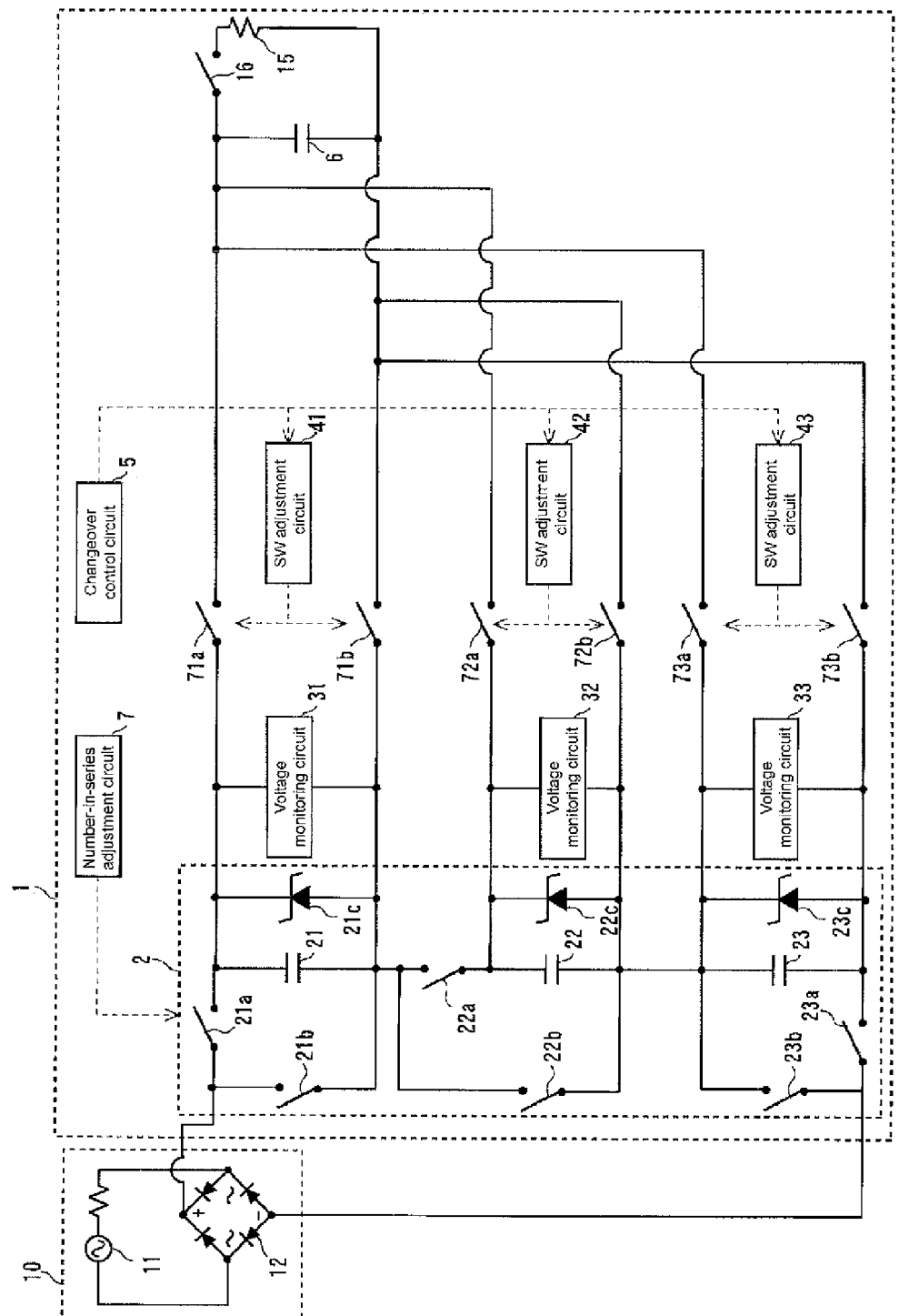
FIG. 11 is a second diagram schematically illustrating the stricture of a voltage conversion circuit according to one or more embodiments of the present invention.

Next, a fifth number-in-series adjustment process will be described, with reference to FIGS. 11 and 12. FIG. 11 is a diagram illustrating another embodiment of voltage conversion circuit 1, and similar components as those in voltage conversion circuit 1 illustrated in FIG. 1 will be designated by the same reference characters and will not be described in detail. The components in voltage conversion circuit 1 illustrated in FIG. 11 are different from the components in voltage conversion circuit 1 illustrated in FIG. 1 in that there is provided, for each primary capacitor, the function of adjusting the upper-limit voltage across the primary capacitor through a Zener diode, instead of the function of restricting the upper-limit value (hereinafter, simply referred to as "the upper-limit voltage") of the inter-terminal voltage across the primary capacitor through the corresponding serial switching circuit. More specifically, for primary capacitor 21, there is provided Zener diode 21c in parallel with primary capacitor 21. For primary capacitor 22, there is provided Zener diode 22c in parallel with primary capacitor 22. For primary capacitor 23, there is provided Zener diode 23c in parallel with primary capacitor 23. By providing Zener diodes 21c to 23c as described above, it is possible to restrict the respective upper-limit voltages across primary capacitors 21 to 23 to values corresponding to these Zener diodes. Namely, Zener diodes 21c to 23c are adapted to adjust the upper-limit voltages across the primary capacitors, by consuming the electric power to be supplied to the respective primary capacitors, through resistance portions provided together with the respective Zener diodes, which are not illustrated in the drawing.

By using the Zener diodes as described above, it is possible to eliminate control regarding aforementioned serial switching circuits 21a etc., in voltage conversion circuit 1, thereby simplifying the contents of the control by number-in-series adjustment circuit 7. However, the Zener diodes are adapted to consume so-called supplied electric power for maintaining the inter-terminal voltages across the primary capacitors and, therefore, according to one or more embodiments of the present invention, the primary capacitors having reached a fully-charged state from being supplied with electric power from power supply circuit 10 is prevented, as much as possible. Therefore, according to one or more embodiments of the present invention, when the primary capacitors have reached a fully-charged state, the bypass switching circuits corresponding thereto can be brought into an ON state, in order to prevent the supplied electric power from flowing into the Zener diodes. However, if the bypass switching circuits are brought into the ON state, this reduces the number of primary capacitors in a state of being serial to power supply circuit 10, which may cause a deviation from a state which enables efficient supply of electric power to the primary capacitors from power supply voltage 10.

Figure 12:
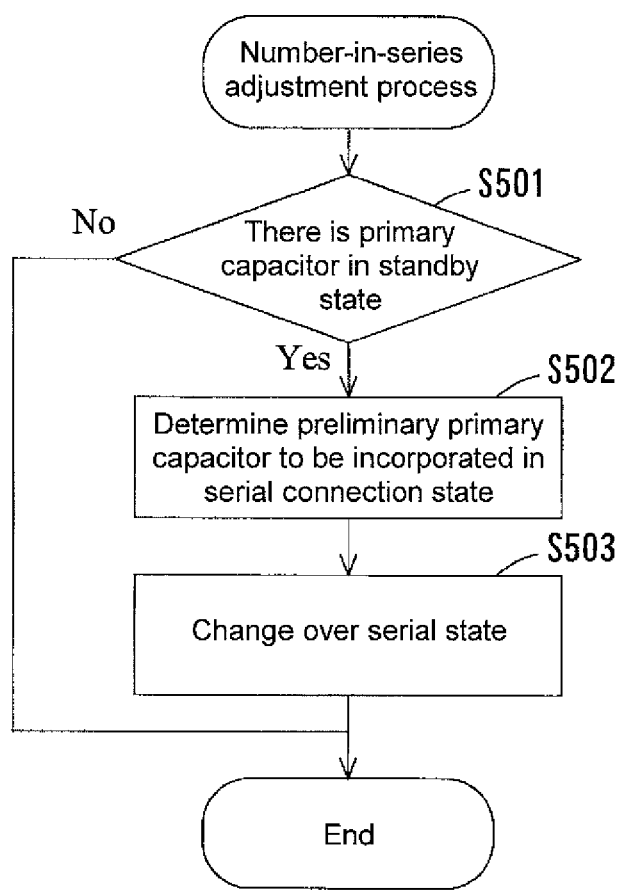
FIG. 12 is a flow chart of a number-in-series adjustment process which is performed by the voltage conversion circuit illustrated in FIG. 11.

In view of the aforementioned facts, the number-in-series adjustment process illustrated in FIG. 12 is performed by number-in-series adjustment circuit 7. This process is also on the premise that the number in series of primary capacitors has been preliminarily determined to be a predetermined number, similarly to the fourth number-in-series adjustment process. At first, in S501, it is determined whether or not there exists a primary capacitor which has reached a fully-charged state and is in a standby state of being capable of charging secondary capacitor 6, out of the predetermined primary capacitors corresponding to the predetermined number which has been preliminarily determined. A positive determination in S501 indicates that the supply of electric power thereto is bypassed for avoiding the consumption of electric power in the Zener diode, thus resulting in insufficient supply of electric power. Accordingly, in this case, the present control proceeds to S502. On the other hand, a negative determination in S501 indicates that the supply of electric power is not bypassed and, therefore, the present control ends.

In S502, a preliminary primary capacitor to be incorporated in a state of being connected in series to power supply circuit 10 is determined. In S503, in order to incorporate this preliminary primary capacitor therein, the ON/OFF state of a bypass switching circuit which corresponds to this primary capacitor is controlled. As described above, with the present process, even in the case of restricting the inter-terminal voltages across the primary capacitors using the Zener diodes, it is possible to realize efficient supply of electric power from power supply circuit 10 to the primary capacitors. The preliminary primary capacitor in the present process is synonymous with the preliminary primary capacitor in the fourth number-in-series adjustment process. The aforementioned processes in S502 and S503 are performed by serial-state changeover section 403.

With voltage conversion circuit 1 adapted to perform the first to fifth number-in-series adjustment processes as described above, it is possible to preferably maintain the efficiency of charging primary-capacitor group 2 by power supply circuit 10 including vibration power generation device 11, which causes the efficiency of voltage lowering from vibration power generation device 11 to the secondary capacitor, and the efficiency of charging the secondary capacitor by vibration power generation device 11 to be extremely preferable, in entire voltage conversion circuit 1. Furthermore, in charging secondary capacitor 6 by the primary capacitors, electric charges are transferred to secondary capacitor 6 while the charging voltages across the respective primary capacitors are monitored. This can realize preferable charging of the secondary capacitor, even when the primary capacitors have capacitances with some variations.

Examples of Modifications

Although, in the aforementioned embodiments, secondary capacitor 6 is constituted by a single capacitor, it can be also constituted by two or more capacitors. The capacitors can be connected to each other either in a serial or parallel form, or in the form of a combination of serial and parallel forms. In this case, provided that the aforementioned relationship between the charging voltage across the primary capacitor and the charging voltage across the secondary capacitor 6 is satisfied between the primary capacitor and the entire secondary capacitor constituted by the two or more capacitors, it is possible to efficiently transfer electric charges from the primary capacitor to the entire secondary capacitor. Further, by properly adjusting the form of the connection between load circuit 15 and the two or more capacitors constituting the secondary capacitor, it is possible to enable voltage conversion circuit 1 to have a plurality of output voltages for load circuit 15.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS

1 Voltage conversion circuit
2 Primary-capacitor group
5 Changeover control circuit
6 Secondary capacitor
7 Number-in-series adjustment circuit
10 Power supply circuit
11 Vibration power generation device
12 Rectification circuit
15 Load circuit
21 to 23 Primary capacitor
21a to 23a Serial switching circuit
21b to 23b Bypass switching circuit
21c to 23c Zener diode
31 to 33 Voltage monitoring circuit
41 to 43 Switching adjustment circuit
71a and 71b Switching circuits
72a and 72b Switching circuits
73a and 73b Switching circuits

The invention claimed is:
1. A voltage conversion circuit comprising:
a plurality of primary capacitors charged by a power supply;

a secondary capacitor connected in parallel to the respective plurality of primary capacitors that is charged at a voltage supplied to a load circuit;

a plurality of switching circuits provided in association with the respective plurality of primary capacitors that change over a connection state between the primary capacitors and the secondary capacitor;

a plurality of voltage monitoring circuits connected in parallel to the respective plurality of primary capacitors that monitors charging voltages across the respective plurality of primary capacitors;

a connection control circuit that successively connects the respective primary capacitors to the secondary capacitor through the corresponding switching circuits when the charging voltages across the respective plurality of primary capacitors reach a predetermined connection voltage that is higher than a charging voltage across the secondary capacitor; and an adjustment circuit that adjusts a connection state between the power supply and the plurality of primary capacitors, such that at least some primary capacitors in the plurality of primary capacitors are in a state of being connected in series to the power supply, in order to maintain an efficiency of electric-power supply from the power supply to the plurality of primary capacitors at a predetermined efficiency.

2. The voltage conversion circuit according to claim 1, wherein the adjustment circuit adjusts the connection state between the power supply and the plurality of primary capacitors, based on a state of charging the secondary capacitor by the plurality of primary capacitors.

3. The voltage conversion circuit according to claim 2, wherein the adjustment circuit selects a primary capacitor to be in the state of being connected in serial to the power supply, out of the plurality of primary capacitors, and wherein the adjustment circuit brings the selected primary capacitor into the serial connection state, in such a way as to supply electric power to the plurality of primary capacitors from the power supply at the predetermined efficiency, in a state where the secondary capacitor is not charged by the plurality of primary capacitors.

4. The voltage conversion circuit according to claim 2, wherein the adjustment circuit selects a primary capacitor to be in the state of being connected in serial to the power supply, out of the plurality of primary capacitors, and wherein the adjustment circuit brings the selected primary capacitor into the serial connection state, in such a way as to supply electric power to the plurality of primary capacitors from the power supply at the predetermined efficiency, in a state where the secondary capacitor is charged by the plurality of primary capacitors.

5. The voltage conversion circuit according to claim 2, wherein the adjustment circuit selects a primary capacitor to be in the state of being connected in serial to the power supply, out of the plurality of primary capacitors, and wherein the adjustment circuit brings the selected primary capacitor into the serial connection state, in such a way as to supply electric power to the plurality of primary capacitors from the power supply at the predetermined efficiency, based on a changeover of the primary capacitor used for charging the secondary capacitor, the changeover performed by the connection control circuit.

6. The voltage conversion circuit according to claim 1, wherein based on a connection state between the power supply and a predetermined primary capacitor of the plurality of primary capacitors and set to be in a state of being connected in serial to the power supply, the adjustment circuit adjusts a serial connection state between the power supply and a preliminary primary capacitor of the plurality of primary capacitors different from the predetermined primary capacitor.

7. The voltage conversion circuit according to claim 6, wherein the adjustment circuit connects the preliminary primary capacitor to the power supply, in a serial connection state, when the predetermined primary capacitor is not in a state of being connected in serial to the power supply.

8. The voltage conversion circuit according to claim 6, further comprising:

an excessive-voltage preventing circuit comprising a Zener diode in association with each of the plurality of primary capacitors for preventing the inter-terminal voltages across the primary capacitors from exceeding a predetermined voltage, wherein, in a state where the predetermined primary capacitor is supplied with electric power from the power supply, when the excessive-voltage preventing circuit restricts the inter-terminal voltage across the predetermined primary capacitor to the predetermined voltage, the adjustment circuit performs a changeover to the preliminary primary capacitor from the predetermined primary capacitor across which the inter-terminal voltage is restricted to the predetermined voltage, in such a way as to bring the preliminary primary capacitor into a state of being connected in series to the power supply.

9. The voltage conversion circuit according to claim 1, wherein the connection control circuit controls the connection state between the primary capacitors and the secondary capacitor, in such a way as to prevent electric short-circuits between the primary capacitors.

10. An electronic apparatus comprising:

the voltage conversion circuit and the load circuit according to claim 1, wherein the voltage conversion circuit lowers an output voltage from the power supply to a voltage supplied to the load circuit.

* * * * *